July 6, 1948. M. L. ROGERS 2,444,850
HEATING AND BRAZING TORCH
Filed Oct. 28, 1946
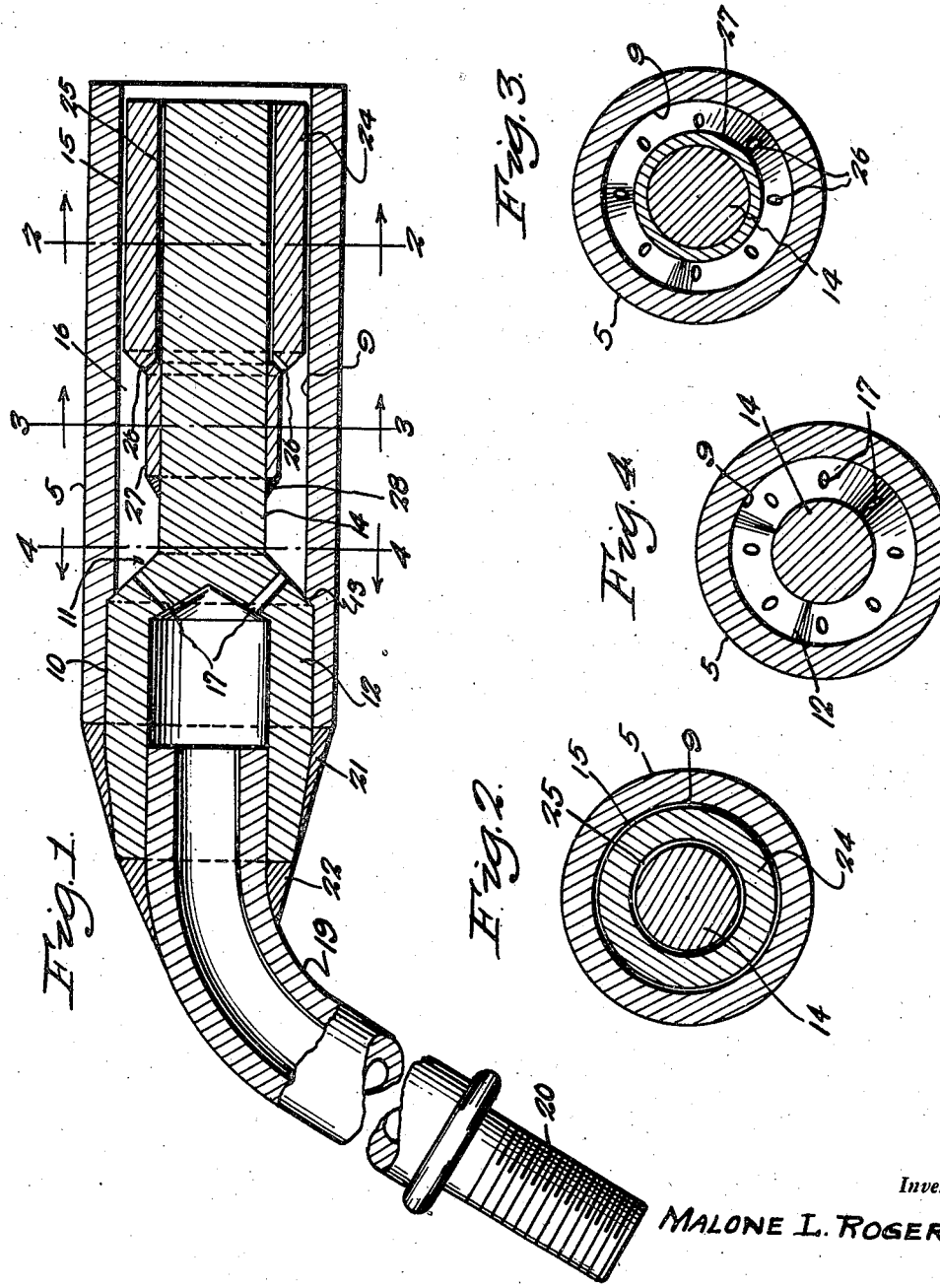
Inventor
MALONE L. ROGERS Patented July 6, 1948

2,444,850

UNITED STATES PATENT OFFICE 2,444,850

HEATING AND BRAZING TORCH

Malone L. Rogers, Portsmouth, Va.

Application October 28, 1946, Serial No. 706,133

3 Claims. (Cl. 158—27.4)

This invention relates to improvements in torches of the type having a single gas supply duct, adapted to use propane or like gas having a slow rate of flame propagation, and provided with a tip which affords a relatively non-intense flame jet such as is required for heating and brazing metals.

It is well known in the art that torch tips have the objectionable fault of getting very hot in use and transmitting the heat to the rest of the torch. An important object of the present invention, therefore, is to provide an improved torch tip that will be free of this heating fault.

Another object is to provide an improved heating and brazing torch tip having an inner passage supplying the gas to a heating flame jet, and means surrounding the inner passage to supply the gas about the heating flame jet so as to provide an outer annular secondary flame which supplements the inner heating flame jet.

A further object is to provide an improved heating and brazing torch tip which includes inner and outer tip members constructed and assembled to facilitate ready and economical manufacture, and to effectively supply the gas through an inner passage to an inner heating jet and through an outer space surrounding the inner passage to and about the heating flame jet.

The exact nature of the present invention, as well as more specific objects and features thereof, will become apparent from the following description when considered in connection with the accompanying drawing, in which:

Figure 1 is a view partly in side elevation, partly broken away, and partly in central longitudinal section, of a heating and brazing torch tip constructed in accordance with the present invention;

Figures 2, 3 and 4 are transverse sections taken respectively on line 2—2, line 3—3, and line 4—4 of Figure 1.

Referring in detail to the drawing, 5 indicates the outer tip member or body which is provided with a main bore 9, and which has a counterbore 10 at its inner end.

The numeral 11 indicates the inner tip member which has a hollow cylindrical inner end portion 12 snugly received in the counterbore 10 and seated at its outer end on the tapered shoulder 13 provided in the outer member or body 5 at the juncture of the main bore 9 with the counterbore 10, so as to provide a support for the inner member 11. The inner tip member 11 also includes a reduced outer end portion 14 that projects axially from the outer end of the inner portion 12 and through the main bore 9 of the outer member 5 in spaced concentric relation to said main bore. The inner part of the portion 14 of the inner member 11 is within the inner portion of the main bore 9 of the outer member 5 so that a relatively large annular chamber 16 is provided about said inner part of portion 14 and intermediate the ends of the outer member 5. Also, the outer part of member 14 has an enlargement or part 24 which is of increased diameter and which provides a restricted annular space 15 between said part 24 and the outer member 5 that leads from the chamber 16 to the tip end of the torch tip. Also, between the part 24 and the central part of the end portion 14 which the part 24 surrounds, there is provided a second inner annular space 25. At its inner end, the part 24 is provided with a plurality of holes 26 which are disposed in forwardly converging relation and afford communication between the chamber 16 and the inner end of the space 25. As shown, the part 24 is in the nature of a sleeve disposed about and in spaced concentric relation to the central part of the portion 14 and having a neck 27 at its inner end which is snugly fitted on said central part of portion 14 and permanently secured to the latter by means of a welding fillet 28. It will be seen that gas supplied to the interior of portion 12 will pass through the holes 17 into chamber 16 and fill the latter, some of the gas passing through holes 26 from chamber 16 to space 25 and issuing from said space 25 at the tip end of the torch tip to provide an inner main annular heating flame. Some of the gas also passes from chamber 16 through the outer annular space 15 and issues from the latter at the tip end of the torch tip to provide a second annular outer flame which surrounds and augments the main inner heating flame.

The inner portion 12 of the inner tip member 11 projects inwardly beyond the inner end of the outer tip member or body 5 and receives an end of a single gas supply duct 19 that has a threaded inner end 20 to facilitate connection of the tip to an ordinary torch handle provided as usual on an end of an ordinary gas supply hose, not shown. The parts 5, 11 and 19 are permanently joined in assembled relation by providing welding fillets 21 and 22, of metal, about the projecting inner part of the portion 12 and about the duct 19 adjacent the inner end of portion 12. The whole unit may then be plated exteriorly to provide a finished construction. The holes 17 are drilled through the inner end of the inner portion 12 of the inner tip member or body 11 and in outwardly diverging relation to afford communication between the interior of portion 12 and chamber 16.

In operation, the end 20 of the duct 19 is connected to a torch handle in the well known way, and the gas is supplied to said duct 19 so that it passes into the portion 12 of the inner tip member 11 and through the holes 17 into the chamber 16. The manner in which the gas passes to and issues from the spaces 25 and 15 to provide the main inner annular heating flame and the outer supplemental annular flame has already been described. The unbroken annular film of gas escaping from the space 15 draws an unbroken layer of air over the outside surface of the tip body by a sort of aspirating action and thus prevents heat from radiating back into and heating the tip and the rest of the torch. Also, as the portion 14 is completely spaced from the outer tip member 5, no material amount of heat is conducted from said portion 14 of the inner tip member to the outer tip member 5.

From the foregoing description, it is believed that the construction, operation and advantages of the present invention will be readily understood and appreciated by those skilled in the art. Modifications and changes in construction are contemplated, such as fall within the scope of the invention as claimed.

What I claim is:

1. A heating and brazing tip comprising an outer tip member having a main bore and having a counterbore at its inner end, and an inner tip member having a hollow cylindrical end portion fitted in said counterbore of the outer tip member and a reduced axial outer portion extending through the main bore to define a surrounding large capacity gas chamber about the inner part of said axial outer portion, said inner portion having holes through its outer end leading to said gas chamber, the outer part of said axial portion being enlarged and spaced from the outer tip member to provide an outer annular space between the same and the outer tip member leading from said chamber to the tip end of the torch tip for supplying gas to an outer annular flame, the enlarged outer part of said axial outer portion also having an inner annular space formed therein concentric with the first named annular space and being provided with holes affording communication between said chamber and the inner end of said inner annular space, said second annular space supplying gas for an inner annular heating flame surrounded by said outer annular flame.

2. The construction defined in claim 1, wherein said enlarged outer part comprises a sleeve mounted on a central portion of the axial outer portion of the inner tip member and disposed in spaced concentric relation to said central portion to provide said second annular space, the second named holes being provided through said sleeve.

3. The construction defined in claim 1, wherein said enlarged outer part comprises a sleeve mounted on a central portion of the axial outer portion of the inner tip member and disposed in spaced concentric relation to said central portion to provide said second annular space, the second named holes being provided through said sleeve, and an integral neck on the inner end of said sleeve snugly fitted on the central portion of said axial outer portion of the inner tip member and permanently secured thereto.

MALONE L. ROGERS.

REFERENCES CITED

The following references are of record in the file of this patent:

UNITED STATES PATENTS

| Number | Name | Date |
| --- | --- | --- |
| 1,125,559 | Kofod | Jan. 19, 1915 |
| 1,483,467 | Meden | Feb. 12, 1924 |
| 1,540,676 | Bagley | June 2, 1925 |
| 1,975,371 | Charles et al. | Sept. 11, 1934 |